(12) United States Patent
Landers, Jr. et al.

(10) Patent No.: US 6,615,520 B2
(45) Date of Patent: Sep. 9, 2003

(54) LIGHTED ARTICLE WITH BRIGHTLY ILLUMINATED INDICIA AND METHOD OF FABRICATING SAME

(75) Inventors: Elorian C. Landers, Jr., Sugarland, TX (US); Stephen L. Landers, Surfside Beach, TX (US); Eric R. Sotelo, Houston, TX (US)

(73) Assignee: Geewhiz.com, Inc., Houston, TX (US)

(*) Notice: Subject to any disclaimer, the term of this patent is extended or adjusted under 35 U.S.C. 154(b) by 0 days.

(21) Appl. No.: 09/842,701

(22) Filed: Apr. 27, 2001

(65) Prior Publication Data

US 2002/0157292 A1 Oct. 31, 2002

(51) Int. Cl.[7] .......................... A44C 3/00; G09F 13/18; G09F 13/04; G09F 3/00
(52) U.S. Cl. .............................. 40/546; 40/564; 40/1.5; 40/334
(58) Field of Search ............................ 40/546, 124.02, 40/442, 541, 542, 564, 582, 1.5, 330, 334, 627, 634

(56) References Cited

U.S. PATENT DOCUMENTS

| | | | | |
|---|---|---|---|---|
| 3,968,584 A | * | 7/1976 | Kingston | 40/546 |
| 4,903,172 A | * | 2/1990 | Schoniger et al. | 40/546 |
| 5,433,024 A | * | 7/1995 | Lerner | 40/546 |
| 5,755,506 A | * | 5/1998 | Ray et al. | 40/1.5 |
| 5,950,340 A | * | 9/1999 | Woo | 40/564 |
| 6,299,372 B1 | * | 10/2001 | Wang | 40/334 |
| 6,341,440 B1 | * | 1/2002 | Lee | 40/541 |
| 6,357,890 B1 | * | 3/2002 | Parsons et al. | 362/116 |

* cited by examiner

*Primary Examiner*—S. Joseph Morano
*Assistant Examiner*—Jason R. Bellinger
(74) *Attorney, Agent, or Firm*—McGinn & Gibb, PLLC

(57) ABSTRACT

A lighted article has a base with a receptacle and a display panel having indicia inscribed thereon and at least one orifice. The display panel is inserted into the receptacle and a lighting element having a light source protruding up from the receptacle is inserted into the orifice for illuminating the indicia on the display panel. The lighted article brightly illuminates the indicia without illuminating other parts of the display panel.

27 Claims, 5 Drawing Sheets

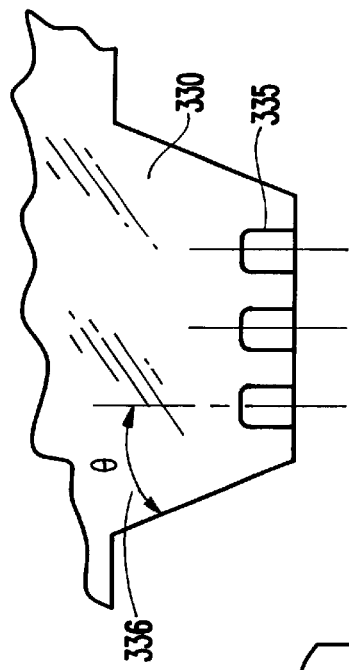
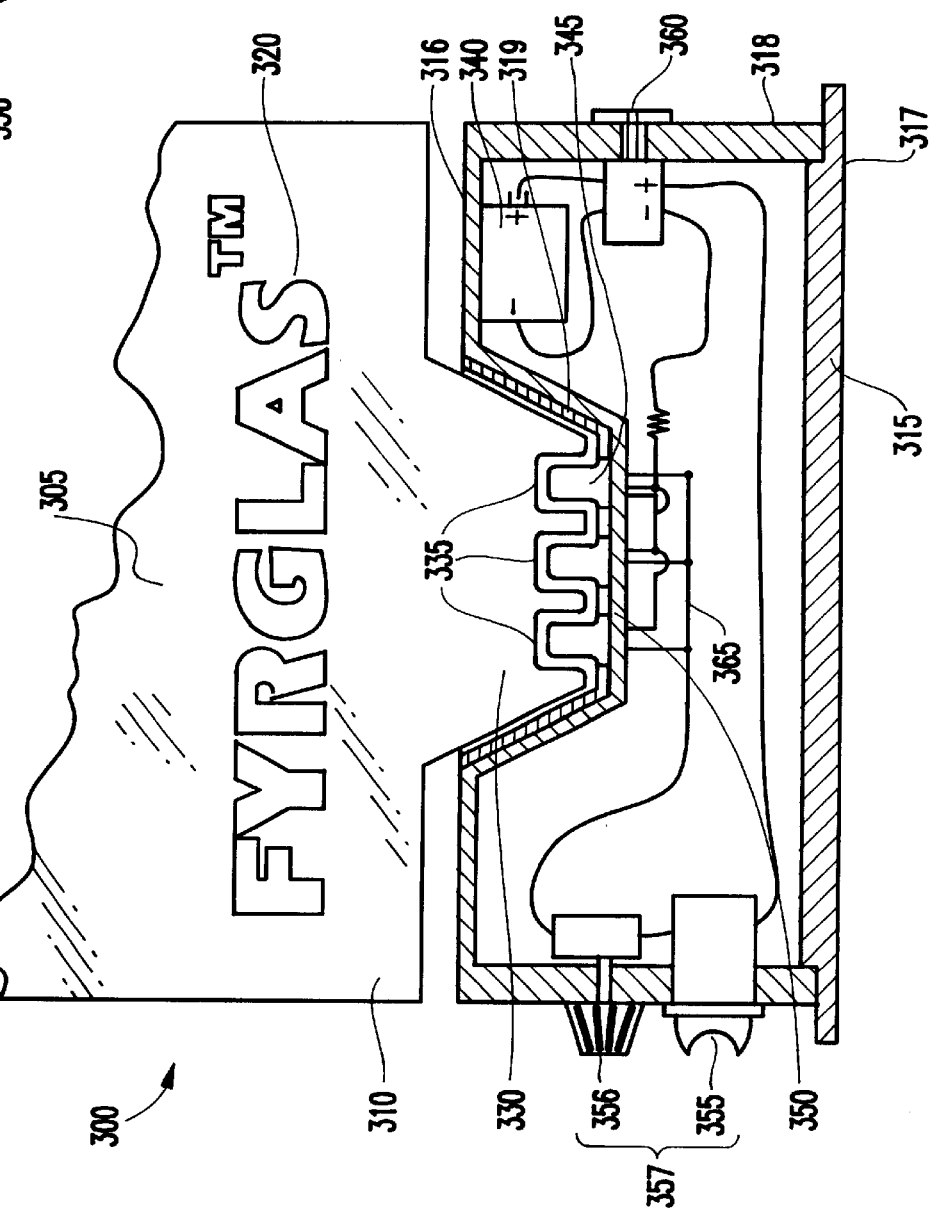

LIGHTED ARTICLE WITH BRIGHTLY ILLUMINATED INDICIA AND METHOD OF FABRICATING SAME

BACKGROUND OF THE INVENTION

1. Field of the Invention

The present invention relates generally to a lighted article and more particularly to a lighted article having interchangeable display panels and brightly illuminated indicia.

2. Description of the Related Art

A lighted sign device is disclosed in U.S. Pat. No. 4,924,612, as illustrated in FIG. 1.

The prior art lighted sign device 100 in FIG. 1, has a light source 15 emitting light 16 into an inlet end 17 of crystalline light-conveying channels 19 of fiber optic cable 18, illustrating light 21 being emitted over a much broader emission area and directed into a limited area of the light-inlet end 24 of crystalline light-conveying channels 26 of fiber optic plastic 22, emitting light 13 of substantially even intensity over a much larger area of the light-outlet portion 25 of the fiber optic plastic 22, such that light emitted or otherwise discernible as associated with the sign as viewed as it strikes the configuration-forming structure 29 and/or passes through the typical through-opening(s) 27a and 27b as light 28a and 28b, makes the defined letter(s), number(s), numeral(s), word(s) and/or other configuration(s) discernible and readable to the viewer of the sign during early morning, late evening and/or night when the light-source is activated to produce light. The fiber optic cable 18 has the fiber optic cable channel light-outlet portion 20. The fiber optic plastic 22 has light-conveying channels 23.

Lighted devices which use light-emitting diodes to illuminate transparent objects are also known in the art. For example, a lighted drinking container 200 using light emitting diodes is disclosed in U.S. Pat. No. 5,575,553, as illustrated in FIG. 2.

The drinking container 200 shown in FIG. 2 includes an elongated sidewall portion 10 of cylindrical contour having a center axis of symmetry 11 and extending between an uppermost lip extremity 12 and a lowermost extremity 13. The sidewall portion is bounded in part by opposed interior and exterior surfaces 14 and 15, respectively.

Indicia 16 is engraved into exterior surface 15. A decorative engraved band 17 encircles the sidewall as part of indicia 16. The nature of the engraving is such that, when magnified, a "V" or wedge-shaped contour 18 is carved, molded or otherwise formed in the sidewall in a manner whereby the walls or facets of the wedge are angled with respect to axis 11.

Further, a base portion 20 is bounded in part by opaque upper panel 21 that joins with the sidewall to form therewith a liquid-impervious vessel, and a flat lower panel 22 orthogonally disposed to the axis and defining with said upper panel an impervious sealable compartment 23.

A lighting mechanism positioned and confined within compartment 23 includes a rechargeable battery 27 and at least one light-emitting diode (LED) 28 activated by the battery. If more than one LED is employed, the LEDs are equidistantly disposed in a circular array beneath sidewall portion 10.

However, the above-referenced lighted devices 100 and 200 make ineffective displays for several reasons. For example, the lighted sign device of FIG. 1 is large and cumbersome and could not be considered portable. In addition, the lighted sign device of FIG. 1 has a light source which is removed from the display so that a large portion of the light is distributed throughout the panel without striking the indicia. In other words, only a small portion of the light generated is used to illuminate the indicia on the display making the sign inefficient. Moreover, the light source is perpendicular to the sign surface and shines light onto the entire surface of the sign not just the portion containing the indicia (e.g., writing, symbols or other message) which is to be conveyed to the viewer. Therefore, the message is illuminated little more than the remainder of the sign surface and is, therefore, hard to distinguish from the remainder of the sign.

The drinking container of FIG. 2 unlike the sign of FIG. 1, disposes the light source adjacent to the container sidewall and may therefore, be more efficient in using the light generated from the light source and more effective at illuminating the indicia on the sidewall of the container. However, like the light source in the lighted sign 100 in FIG. 1, the light source in the drinking container 200 is removed from the sidewall of the container and, therefore, does not efficiently transmit light from the light source to the indicia. In addition, a considerable amount of light in the drinking container is lost near the light source through the lowermost extremity of the drinking container. As a result, an insufficient amount of light is directed to the indicia 16 making the glass an ineffective lighted display.

Furthermore, the indicia in the drinking container must be engraved into the display panel in a costly and time consuming operation. In addition, the color of the indicia when lighted is limited to the color of the light source, further limiting the effectiveness of the display.

SUMMARY OF THE INVENTION

In view of the foregoing problems, it is an object of the present invention to provide a lighted article which may have interchangeable panels and which can be intensely and selectively illuminated to provide a three dimensional or depth effect.

It is also an object of the present invention to provide a lighted article which can effectively and efficiently display multicolored indicia, regardless of a color of a light source.

It is also an object of the present invention to provide a lighted article which is durable yet versatile in its application and can be used, for example, in pens, key chains, badges, etc.

It is also an object of the present invention to provide a lighted article which effectively illuminates indicia on a display panel and which is durable for use in rough environments.

It is also an object of the present invention to provide a simple and effective method of fabricating a lighted article with brilliantly illuminated indicia.

In a first aspect, the lighted article includes a base, a display panel having indicia inscribed thereon and coupled to a receptacle in the base, and the display panel also having at least one orifice. In addition, a lighting element having at least one light source protruding up from inside the receptacle is inserted into the orifice for illuminating the indicia. The inventive lighted article may form, for example, a lighted display plaque, pen, key chain, badge or other such lighted object.

Further, the display panel is not limited in its shape and may be, for example, flat, curved or cylindrical. Further, the display panel may be formed of acrylic or other clear material such as plastic or glass, and may be removably or permanently coupled in the base receptacle and may further be integrally formed with the base. In addition, the display panel may include a flange portion in which the orifices are disposed, and the receptacle and flange portion may have lateral edges that are tapered at an angle of about 30 degrees off vertical to optimize light transmission into the display panel. Further, the orifices may be polished to enhance the transmission of light into the display panel.

In addition, the inner walls of the receptacle may have a reflective coating for reflecting light into the display panel. Further, an upper portion of the receptacle walls may be elevated from a top surface of the base.

Further, the indicia may be etched into the display panel or printed on the display panel using a translucent ink. In addition, an ink having an etching property causing the ink to etch into the display panel may be used to provide brighter illumination of the indicia. Further, regardless of whether indicia are etched or printed, only the indicia containing portions of said display panel are intended to be illuminated, not the non-indicia containing portions of said display panel.

Further, the lighting element may include a power supply such as a battery for supplying power to the light source, and a printed circuit board for controlling power supplied to the light source. Further, the light source may be an LED, halogen bulb or other light emitting source. Further, the lighting element may include a timing element which causes the lighted article to be activated and deactivated after a predetermined period of time.

The base may also include a switching element for activating and deactivating the light source. The switching element may include, for example, an on/off switch, a rheostat, a touch-sensitive switch, a motion-sensitive switch or a sound-sensitive switch. The switching element may also be attached to a connecting device such as a ring, which connects the lighted article to, for example, a necklace so that the light source may be activated or deactivated by pulling on the article to engage the switching element.

In another embodiment, the claimed invention includes a method for fabricating a lighted article including inscribing indicia on a display panel, forming a base having a receptacle and a lighting element, and inserting the display panel into the base receptacle. The indicia may be inscribed by etching or by printing with a translucent ink. Further, the ink may be of a formula so as to etch the surface of the display panel to improve light transmission through the indicia. The ink indicia may also be printed onto the display panel by silk-screening.

With its unique and novel design and features, the claimed invention provides a unique, easily fabricated lighted article having easily interchangeable panels and efficiently providing brightly illuminated indicia without lighting non-indicia containing portions of the display panel.

BRIEF DESCRIPTION OF THE DRAWINGS

The foregoing and other objects, aspects and advantages will be better understood from the following detailed description of a preferred embodiment of the invention with reference to the drawings, in which:

FIG. 3A is a schematic drawing of a lighted article according to an aspect of the present invention;

FIG. 3B is a schematic drawing of a flange portion of a display panel for a lighted article according to the present invention;

DESCRIPTION OF THE PREFERRED EMBODIMENTS

Referring to FIG. 3A, a first embodiment of the lighted plaque 300 according to a first aspect of the present invention is shown.

The lighted plaque 300 shown in FIG. 3A includes a base 315 and a transparent interchangeable display panel 305 on which indicia 320 may be inscribed. The display panel 305 may be flat as indicated by FIG. 3A or may have a curved or other design.

Indicia 320, which may include words, logos, advertising data or the like, may be engraved or etched into the surface of the display panel 305. In this case, the nature of the engraving is such that, when magnified, a V-shaped or wedge-shaped contour is carved, molded or otherwise formed in the surface in a manner whereby the walls or facets of the wedge are angled with respect to axis which is parallel to the surface. The innermost penetration of the engraving, or apex of the wedge configuration may be located at a distance within the sidewall representing between about 10% and 40% of the thickness of the panel 305.

However, the indicia 320 may also be inscribed on the display panel 305 by using a translucent ink through a process, for example, such as silk-screening. Indeed, the inventors have discovered that a translucent ink which actually etches the display panel 305 can greatly improve the transmission of light through the indicia for a more effective display panel than an engraved or etched display panel. In addition, the ink may be of different colors so that the indicia when lighted may contain many different colors which is not attainable with engraved indicia.

Figure 1:
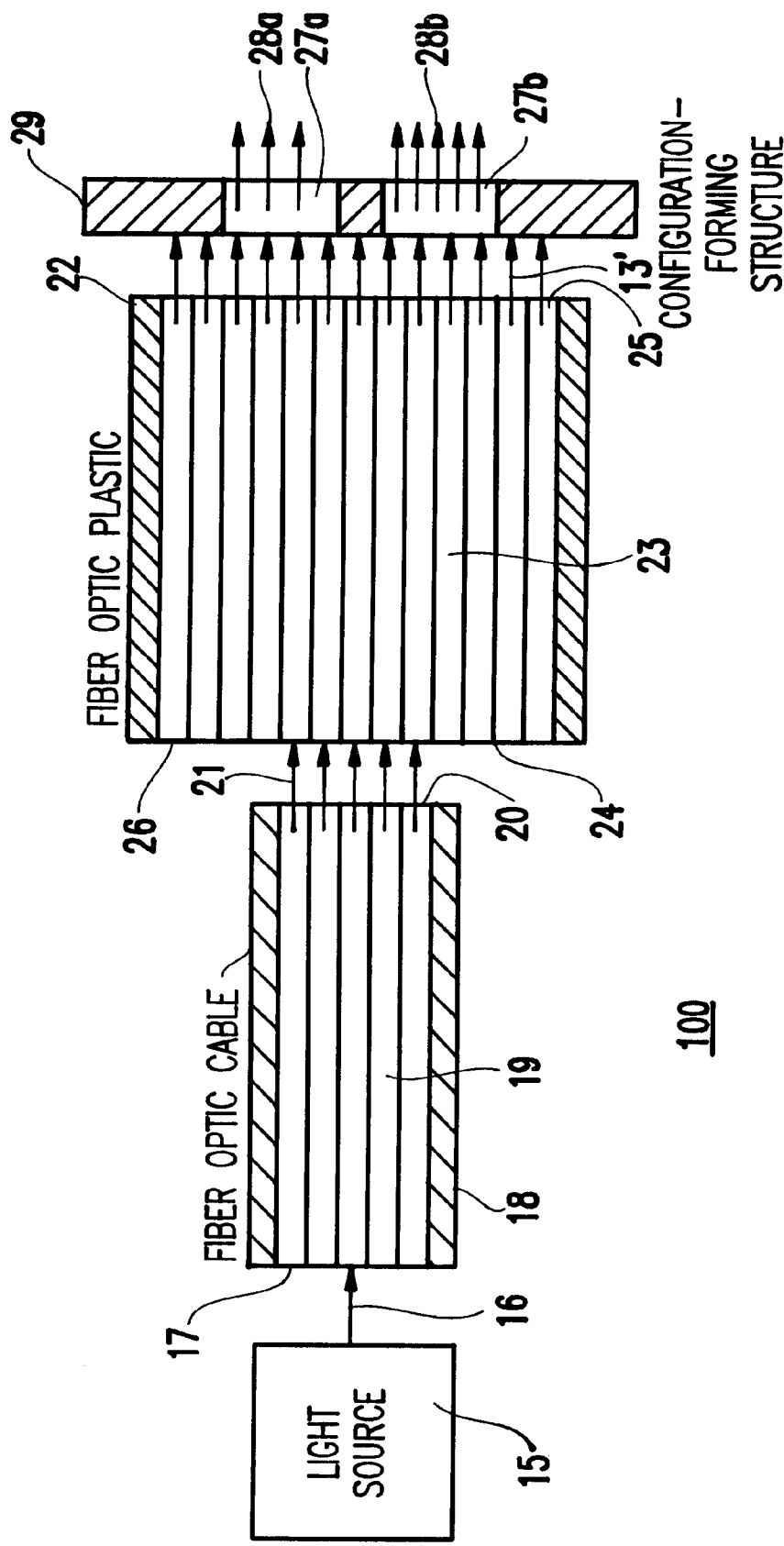
FIG. 1 is a schematic drawing of a lighted sign device according to the prior art.
Figure 2:
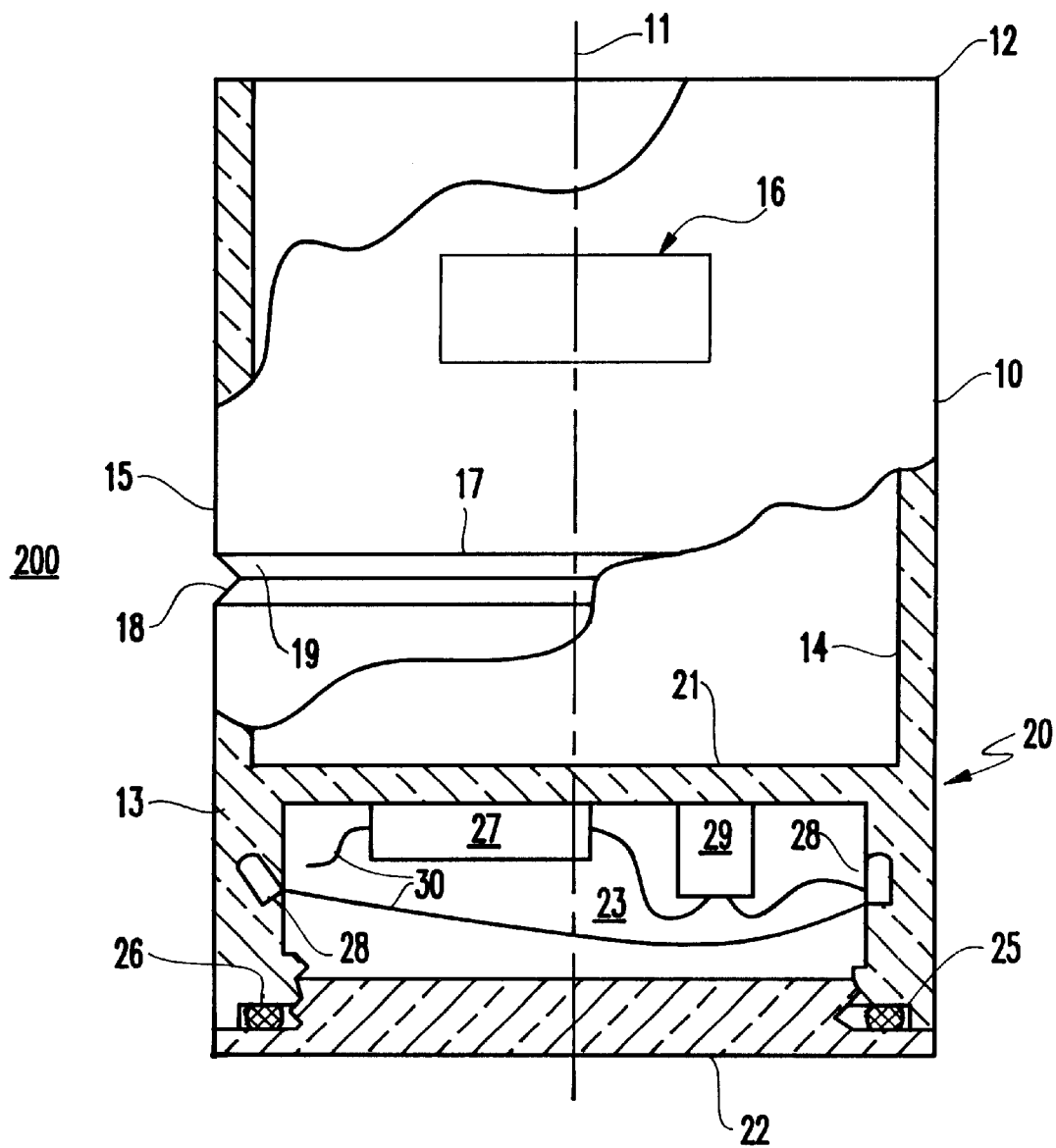
FIG. 2 is a partial vertical sectional view of a lighted drinking container according to the prior art.

Further, instead of disposing the light source behind the display panel as in FIG. 1 or underneath the glass sidewall as in FIG. 2, the inventors have discovered that the transmission of light to the indicia is greatly improved by actually inserting the light source directing into the display panel 305. This efficient design eliminates the loss of light between the light source and the display panel, ensuring a brilliantly illuminated indicia on the display panel.

This is illustrated in FIG. 3A which shows a light source 345 actually inserted into the display panel 305. As shown in FIGS. 3A and 3B, the display panel 305 has a flange portion 330 which extends from the lower end 310 of the panel 305. This flange portion 330 has at least one orifice 335 which is located in the bottom edge of the flange portion 330 for receiving at least one light source 345. The light source 345 may extend about 4 mm to 5 mm into the display panel 305 for good illumination. Of course, the size of the orifices 335 depends on the size of the light sources 345. In addition, the number of light sources 345 required to provide good illumination also depends on the size and material of the display panel 305, but generally, for example, 2 or 3

LED's may provide good illumination for a round acrylic display panel which is about 6 or 8 inches in diameter.

The transparent interchangeable panel 305 is supported by the base 315 which has an upper surface 316 which includes the receptacle 319 for receiving the flange portion 330 of the display panel 305. On the bottom of the receptacle 319 are light sources 345 which are inserted into the display panel 305 when the flange portion 330 is inserted into the base 315. The light sources 345 may include, for example, light-emitting diodes (LEDs), fiber optic devices or halogen bulbs. The orifices 335 may be well-polished to allow for optimum transmission of light from the light sources 345 into the display panel 305. The orifices 335 may be tightly fitted around the light sources 345 to further ensure improved light transmission and efficiency.

Moreover, the inventors have discovered that the walls of the receptacle 319 may be used to reflect the light from the light-emitting diodes 345 up into the panel 305 so that, unlike the lighted container of FIG. 2 where light is lost through the lowermost extremity 13 of the glass, the walls of the receptacle 319 in the inventive article ensure that substantially little or no illumination effect is lost, thereby providing for a brilliantly illuminated display. The top of the walls of the receptacle 319 may be, for example, above the top of the light source 335 so that substantially none of the light from the light source 335 exits the display panel near the light source, but is reflected up into the display panel and the indicia.

Moreover, as indicated in FIG. 3B, the inventors have discovered that light transmission and efficiency may be improved by providing the flange portion 330 and the receptacle 319 with a tapered design. Specifically, the inventors have found that optimal qualities are realized when the angle of taper 336 is about 30°. The inventors found that such a taper effectively redirects light from the light sources 345 up into the display and efficiently transmitted to the indicia. Further, the dimensions of the receptacle 319 and the flange portion 330 should be sufficient to provide stability to the display panel 305 and, therefore, depends generally on the size of the display panel 305. Generally, for example, for a 6 or 8 inch diameter round acrylic display panel the depth of the receptacle 319 may be about 0.5 inches. Furthermore, the top of the receptacle 319 does not necessarily have to be the top surface of the base 315, but instead, the receptacle 319 may be built up from the top surface of the base 315 so that the walls of the receptacle 319 extend above the top surface of the base 315.

In addition, the light transmission efficiency may be further improved by coating the inside of the receptacle 330 with a reflective material. For example, a aluminum coated mylar film may be secured by adhesive to the inside of the receptacle 330 to reflect light from the light sources 345 and more effectively redirect light up and into the display panel 305.

The interchangeable display panel 305 may be held securely in the base 315 by the frictional force of the walls of the recessed portion 319 on the flange portion 330. This allows the panel 305 to be quickly and effortlessly inserted and removed from the base 315. Alternatively, the walls of the receptacle may be made spring-like so as to increase the friction force applied to the flange portion 330, so the display panel 305 may be more securely inserted into the base 315, while remaining temporary and removable.

Further, the base 315 may have any of various shapes, for example, such as a box, cylinder, etc. As shown in FIG. 3A, the base 315 may have a bottom surface 317, sidewalls 318 and an upper surface 316 which is connected to the top of sidewalls 318 about the periphery of the upper surface 316. The bottom of the sidewalls 318 are connected to the bottom surface 317. The inside of the base may also be made accessible by making one of the walls removable, for example, by securing it to the remainder of the base by screws or the equivalent. For example, if the base 315 is of a cylindrical design, the bottom surface 317 may further serve as a threadably removable disc which may be removed to access the inside of the base 315.

As also shown in FIG. 3A, inside the base 315 are disposed various portions of the switching element and lighting element. These elements are described in detail below but for purposes of the current discussion, it is important to note that the location of these elements in FIG. 3A is only illustrative. That is to say that these lighting and switching elements may be located at other positions in the base 315 than those illustrated in FIG. 3A.

In addition, it should be noted that the light sources 345 do not need to be disposed in the center of the panel 305 as illustrated in FIG. 3A but may be, for example, distributed throughout the length of the display panel 305. Moreover, this receptacle 319 does not necessarily need to be positioned in the center of the base but may be otherwise positioned to provide versatility to the inventive lighted article. Further, the light sources 345 can emit any colored light and are not limited to, for example, white or red light emitting light sources.

As discussed briefly above, and as shown in FIG. 3A, a lighting element 365 is confined within the base 315 and may include the light sources 345 and a power source 340 such as a battery (which may be rechargeable) to provide power to the light sources 345. The lighting element 365 may further include a printed circuit board 350 to which the light sources 345, power source 340 and switching element 357 are electrically coupled.

Further, as mentioned briefly above, a switching element 357 is also secured inside the base 315. This switching element 357 may be electrically coupled between the power source 340 and the light sources 345 and may include an on/off switch 355 to activate/de-activate the light sources 345. The switching element 357 may also include a rheostat 356 for providing an infinitely variable power supply to the light sources 345 and thereby providing infinitely variable illumination of the indicia 320.

In addition, the switching element 357 may include a touch-sensitive switch or motion switch. The electrical details and configuration of such switches are known in the art and, for brevity, will not be disclosed herein. In lieu of or in addition to the touch-sensitive or motion-sensitive switch, a light-sensitive switch, sound-sensitive switch or other similar switch may be suitably employed.

With such a switch, the light sources 345 may be illuminated by a user by simply touching the base 315 or by a sound such as the user's voice. Once activated, the switch preferably deactivates the light sources 345 after a predetermined time period (e.g., one minute), by a suitable sensing device employed with the printed circuit board 350 with a timer, or the like. Alternatively, the light sources 345 can be deactivated by a second touch or a second sound being applied thereto, or other means, depending on the switching element. Further, the illumination of the indicia 320 can be made to operate in a "pulsing" manner by suitably adjusting an electronic timer on the printed circuit board 350.

In addition, when a rechargeable battery is employed as the power source 340, the base 315 may include a charging socket 360 disposed in the base sidewall 318 to allow for re-charging the battery. Also, solar cells may be incorporated into the base 315, facing toward the bottom surface 317 of the base 315, so that, when the lighted display 300 is upside down, the solar cells will utilize ambient light to re-charge the battery. The base 315 may also be otherwise opaque, to thereby conceal its contents.

In operation, as light travels through the display panel 305, it exits only where an image is etched or embossed, which causes the image to glow. The rest of the panel remains clear except for the rim of the display panel 305 where in the light exits.

Furthermore, although the display panel 305 described above with respect to the lighted plaque 300 is intended to be effortlessly removed from the base 315 and replaced with another display panel, the lighted article may be formed of a display panel 305 which is more securely affixed to the base 315, for example, when necessary to provide a durable connection. For example, the display panel 305 may be secured to the base 315 by screws, glue, or the like to prevent the display panel 305 from detaching from the base 315 even under rough conditions. The display panel 305 may even be integrally formed with the base 315 from one continuous piece of material, so that the lighted display may be used, for example, as a durable badge.

By securely affixing the display panel 305 into the base 315, the lighted article may be used in environments which would otherwise result in the panel 305 being unintentionally pulled out of the base 315. This allows the lighted article to be used in a variety of applications such as, for example, a badge, key chain or pen.

Figure 4A:
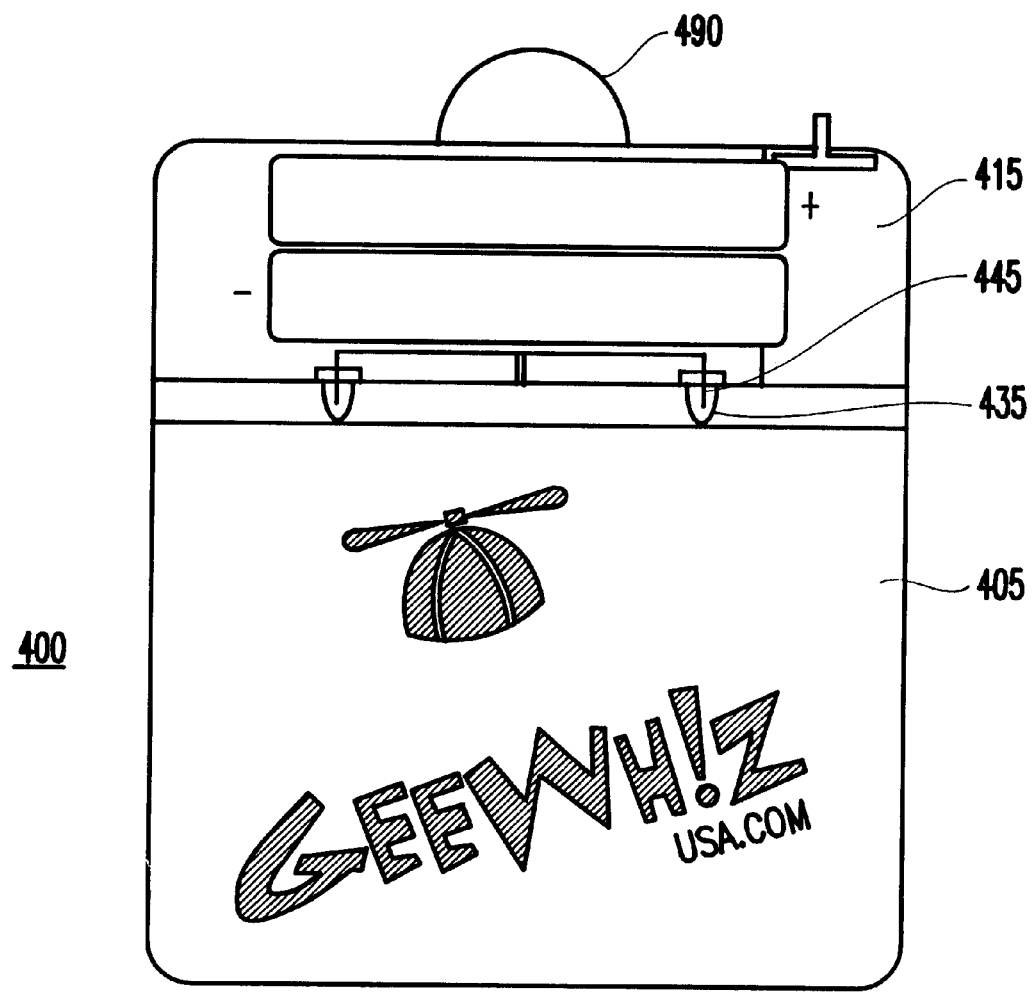
FIG. 4A is a schematic drawing of another aspect of a lighted article according to the present invention.
Figures 4B, 4C:
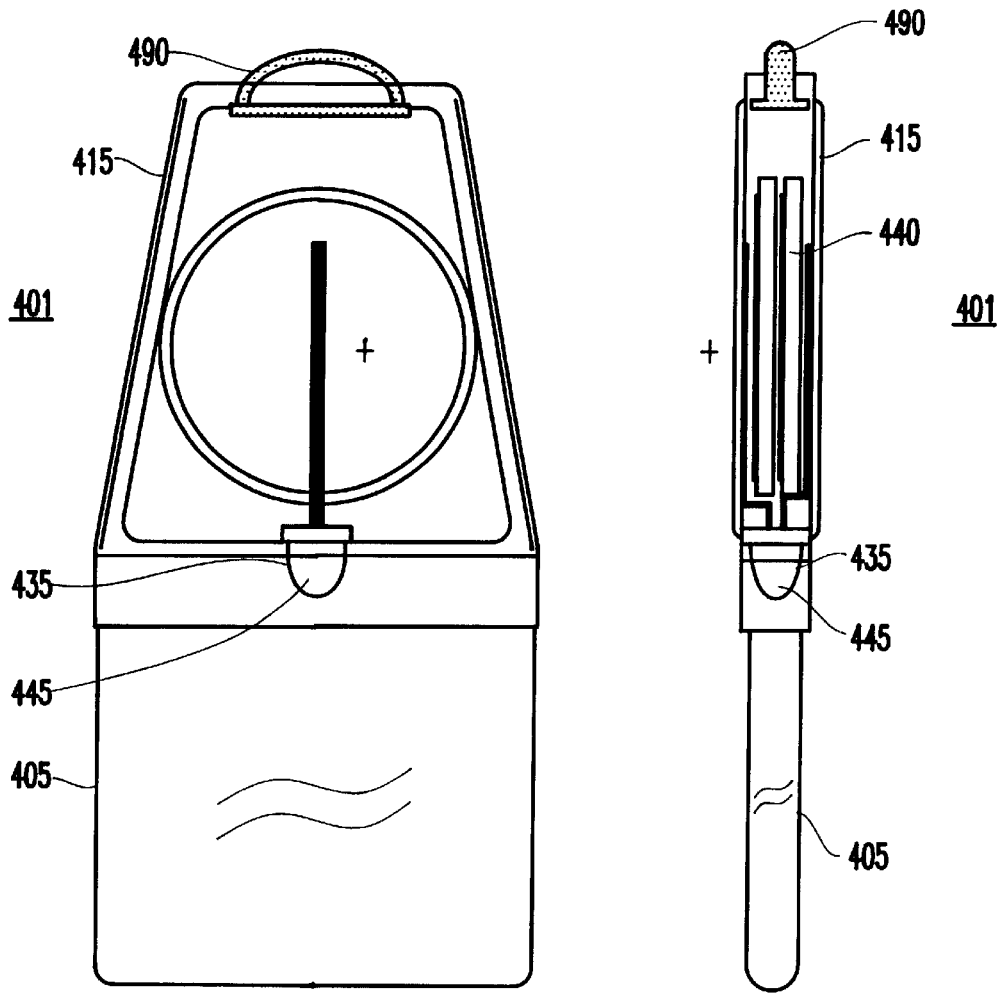
FIG. 4B and FIG. 4C are schematic drawings of other aspects of a lighted article according to the present invention.

For example, FIG. 4A shows a lighted badge 400 according to another aspect of the invention, in which the display panel 405 is securely affixed to the base 415, and FIGS. 4B and 4C show a lighted key chain 401 according to another aspect of the invention, also in which the display panel 405 is securely affixed to the base 415. The lighted articles in FIGS. 4A, 4B and 4C are similar in design to the lighted plaque in FIG. 3A.

For example, similar to the aspect shown in FIG. 3A, in the lighted articles illustrated in FIG. 4A and in FIGS. 4B and 4C, the display panel 405 may have polished orifices 435 for receiving a light source 445. The indicia on the display panel 405 may be inscribed as described above with respect to the lighted plaque 300. In addition, the base 415 contains a lighting element and a switching element like the lighted device 300.

However, unlike the lighted plaque in FIG. 3A, in the lighted badge 400 and the lighted key chain 401, for example the display panel 405 is more securely affixed to the base 415 by, for example, screws, glue or the like. In addition, the display panel 405 may be more securely held in the receptacle 319 by securing a snap or spring like element in the walls of the receptacle 319 and/or flange portion of the display panel so that the display panel 405 is securely held into the receptacle 319 in a rough environment without the need for screws, glue or the like. In addition, the base of the lighted badge 400 and the base of the lighted key chain 401 each have a connecting element 490 such as a pin, wire, loop, velcro, or the like, by which the lighted badge 400 and the lighted key chain may be affixed to clothing, keys, jewelry (such as a necklace) or other objects. Further, because the display panel 405 is securely affixed to the base 415, the lighted badge 400 and the lighted key chain 401 may be disposed with the display panel 405 hanging down from the base 415 without concern for the display panel 415 becoming detached from the base 415. Furthermore, the lighted articles 400 and 401 may include a small power source 440 such as two 1.5 V flat batteries, as shown in FIG. 4C.

In addition, the switching element 357 may be attached to the connecting element 490 so that the connecting element 490 may be used to engage the switching element 357. In this case, for example, the connecting element 490 may be pushed, pulled, twisted, etc. to engage the switching element 357 and thereby activate or deactivate the light source 345. Further, the switching element 357 may be connected to the walls of the base 415 so that the switching element 357 may be engaged, for example, by applying pressure the walls of the base 415.

Figure 5:
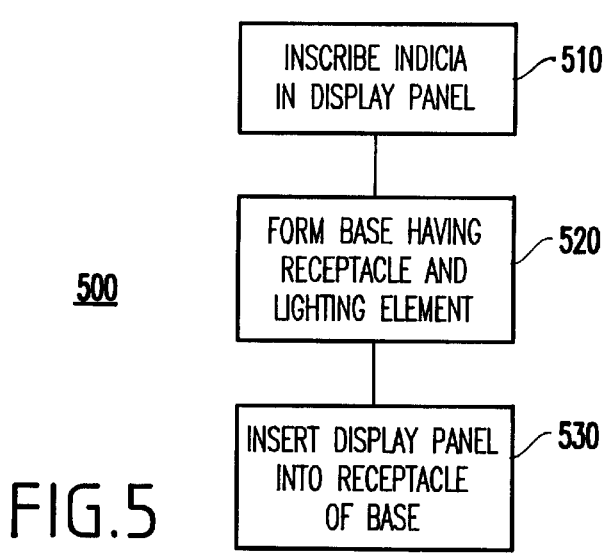
FIG. 5 is a flow chart illustrating a method for fabricating a lighted article according to another embodiment of the present invention.

Furthermore, a method 500 for fabricating the lighted article is provided in FIG. 5. For ease of explanation, all of the above-referenced discussion with respect to the lighted article above is incorporated by reference herein. As shown there, a method 500 for fabricating a lighted article includes inscribing 510 indicia on a display panel. As explained above, the indicia may be etched or ink indicia. Further, the ink indicia may be printed onto the surface of the display panel using a translucent ink which etches the surface of the display panel to improve light transmission through the indicia. In addition, the ink indicia may be inscribed onto the surface of the display panel by silk-screening or a like process. Furthermore, the display panel may be acrylic or other clear plastic and have orifices for inserting light sources and may have a flange portion for inserting into a base.

The method 500 further includes forming 520 a base having a receptacle for receiving a display panel, and a lighting element. As explained above, the base may be of various designs. The base may further include a switching element for activating and deactivating the lighting element. The lighting element may further include a light source, a power supply and a printed circuit board. Further, the receptacle may be tapered and the walls of the receptacle may have a reflective coating to direct light into the lighted display.

The method 500 additionally includes inserting 530 the display panel into the receptacle of the base. As explained above, the display panel can be removably or permanently inserted into the base. Further, the light sources in the base may protrude into orifices into the display panel so that the light from the light sources are efficiently transmitted into the display panel and illuminates only the indicia without illuminating the rest of the display panel.

With its unique and novel design and features, the claimed invention provides a lighted article which may have interchangeable panels, provides brightly illuminated indicia and is easily manufactured.

While the invention has been described in terms of several preferred embodiments, those skilled in the art will recognize that the invention can be practiced with modification within the spirit and scope of the appended claims.

What we claim is:

1. A lighted article, comprising:
   a base, having a receptacle;
   a display panel with indicia inscribed thereon and having at least one orifice, said display panel being inserted into said receptacle; and
   a lighting element having at least one light source protruding up from said receptacle and inserted into said at least one orifice for illuminating said indicia,
   wherein indicia containing portions of said display panel are illuminated without illuminating non-indicia containing portions of said display panel.

2. The lighted article according to claim 1, wherein said display panel is removably coupled to said receptacle of said base.

3. The lighted article according to claim 1, wherein said display panel is permanently coupled to said receptacle of said base.

4. The lighted article according to claim 1, wherein said display panel comprises a flange portion in which said orifices are disposed, and wherein said receptacle and said flange portion have lateral edges that are tapered at an angle of about 30 degrees off vertical.

5. The lighted article according to claim 1, wherein said lighting element further comprises:
   a power supply for supplying power to said at least one light source; and
   a printed circuit board for controlling power supplied to said at least one light source.

6. The lighted article according to claim 1, further comprising:
   a switching element in said base for activating said at least one light source.

7. The lighted article according to claim 1, wherein said display panel comprises one of a flat display panel and a curved display panel.

8. The lighted article according to claim 1, wherein said indicia are etched onto a surface of said display panel.

9. The lighted article according to claim 1, wherein said indicia comprise colored ink indicia which are printed onto a surface of said display panel using a translucent ink, and
   wherein said translucent ink etches said surface of said display panel to improve light transmission through said indicia.

10. The lighted article according to claim 1, wherein said at least one light source comprises one of a light-emitting diode (LED) and a halogen bulb.

11. The lighted article according to claim 1, wherein a surface of said orifice is polished to enhance transmission of light into said display panel.

12. The lighted article according to claim 6, wherein said switching element comprises one of an on/off switch, a push/pull switch, a rheostat, a touch-sensitive switch, a motion-sensitive switch and a sound-sensitive switch.

13. The lighted article according to claim 1, wherein said lighting element comprises a timing element which causes said lighted article to be at least one of activated and deactivated after a predetermined period of time.

14. The lighted article according to claim 1, wherein said display panel is integrally formed with said base.

15. The lighted article according to claim 1, wherein a wall of said base is removable for accessing an inside of said base.

16. The lighted article according to claim 8, wherein said indicia are etched into said display panel at a depth of between about 10% and 40% of a thickness of said display panel.

17. The lighted article according to claim 1, wherein said display panel comprises one of acrylic and glass.

18. The lighted article according to claim 1, wherein said display panel comprises optically transparent plastic.

19. The lighted article according to claim 1, wherein said at least one light source comprises a plurality of light sources.

20. The lighted article according to claim 1, wherein a wall of said receptacle of said base has a reflective coating for reflecting light into said display panel.

21. The lighted article according to claim 1, wherein an upper portion of a wall of said receptacle is elevated from a top surface of said base.

22. The lighted article according to claim 1, further comprising:
   a connecting element for securing said lighted article to another object.

23. The lighted article according to claim 1, wherein said lighted article comprises one of a pen, a key chain and a badge.

24. The lighted article according to claim 9, wherein said translucent ink comprises multicolored translucent ink.

25. A method for fabricating a lighted article, comprising:
   inscribing indicia on a display panel having at least one orifice;
   forming a base having a receptacle and a lighting element, said lighting element having at least one light source protruding up from said receptacle; and
   inserting said display panel into said receptacle of said base so that said at least one light source is inserted into said at least one orifice,
   wherein indicia are inscribed on said display panel such that said at least one light source illuminates indicia containing portions of said display panel without illuminating non-indicia containing portions of said display panel.

26. The method according to claim 25, wherein said inscribing indicia comprises inscribing ink indicia which are printed onto a surface of said display panel using a translucent ink, and
   wherein said ink etches said surface of said display panel to improve light transmission through said indicia.

27. The method according to claim 25, wherein said inscribing ink indicia comprises silk-screening said ink indicia onto said surface of said display panel.

* * * * *